US010509856B2

(12) United States Patent
Berkland et al.

(10) Patent No.: US 10,509,856 B2
(45) Date of Patent: Dec. 17, 2019

(54) SIMPLIFYING COMPLEX INPUT STRINGS

(71) Applicant: HRB Innovations, Inc., Las Vegas, NV (US)

(72) Inventors: Matthew Berkland, Belton, MO (US); Daniel D. Martin, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 368 days.

(21) Appl. No.: 15/228,646

(22) Filed: Aug. 4, 2016

(65) Prior Publication Data

US 2018/0039609 A1    Feb. 8, 2018

(51) Int. Cl.

| G06F 17/24 | (2006.01) |
|---|---|
| G06F 17/27 | (2006.01) |
| G06F 3/0489 | (2013.01) |
| G06F 17/21 | (2006.01) |
| G06Q 40/00 | (2012.01) |

(52) U.S. Cl.
CPC ........ *G06F 17/243* (2013.01); *G06F 3/04895* (2013.01); *G06F 17/215* (2013.01); *G06F 17/273* (2013.01); *G06F 17/246* (2013.01); *G06Q 40/123* (2013.12)

(58) Field of Classification Search
CPC .... G06F 17/215; G06F 17/243; G06F 17/246; G06F 17/247; G06F 17/273; G06F 3/0481; G06F 3/04895; G06Q 40/123
USPC ................ 715/221, 224, 225, 226
See application file for complete search history.

(56) References Cited

U.S. PATENT DOCUMENTS

| 5,603,021 | A * | 2/1997 | Spencer ................ G06F 17/246 |
| 5,630,126 | A * | 5/1997 | Redpath .................. G06F 17/24 |
| 5,842,180 | A * | 11/1998 | Khanna ............... G06F 3/04895 |
| | | | 705/30 |
| 6,460,059 | B1 * | 10/2002 | Wisniewski .......... G06F 17/246 |
| | | | 715/205 |
| 7,318,192 | B1 * | 1/2008 | Hobbs .................... G06F 17/246 |
| | | | 715/212 |
| 7,636,742 | B1 | 12/2009 | Olavarrieta et al. |
| 7,912,767 | B1 * | 3/2011 | Cheatham ............ G06Q 40/123 |
| | | | 705/31 |
| 7,966,561 | B1 * | 6/2011 | Nguyen ................. G06Q 40/00 |
| | | | 715/221 |
| 8,407,113 | B1 * | 3/2013 | Eftekhari ............. G06Q 40/123 |
| | | | 705/31 |
| 2002/0143831 | A1 * | 10/2002 | Bennett ................. G06F 17/246 |
| | | | 715/267 |

(Continued)

*Primary Examiner* — David S Posigian
(74) *Attorney, Agent, or Firm* — Erise IP, P.A.

(57) ABSTRACT

Simplification of complex input strings is utilized for user convenience, such that the user may input a complex input string in lieu of performing an external calculation and inputting the result thereof. The simplification identifying at least one operator in the complex input string indicative of a mathematical operation, identifying a first sub-string and a second sub-string in the input string, comparing the first sub-string to an expectation identification associated with the input field to determine a significance of the first sub-string, comparing the first sub-string to a range expectation associated with said significance to determine if the first sub-string meets the range expectation, and calculating a simplified input string by performing the mathematical operation on the first sub-string and the second sub-string.

11 Claims, 4 Drawing Sheets

(56) References Cited

U.S. PATENT DOCUMENTS

| | | | | |
|---|---|---|---|---|
| 2004/0083145 | A1* | 4/2004 | Kobayashi | G06Q 40/02 |
| | | | | 705/31 |
| 2004/0205524 | A1* | 10/2004 | Richter | G06F 17/246 |
| | | | | 715/213 |
| 2007/0256004 | A1* | 11/2007 | Payette | G06F 17/246 |
| 2008/0028289 | A1* | 1/2008 | Hicks | G06F 17/243 |
| | | | | 715/224 |
| 2008/0115056 | A1* | 5/2008 | Escapa | G06F 17/215 |
| | | | | 715/267 |
| 2014/0040741 | A1* | 2/2014 | van Os | G06F 3/0481 |
| | | | | 715/719 |
| 2014/0181163 | A1* | 6/2014 | Pang | G06F 15/02 |
| | | | | 708/131 |

* cited by examiner

SIMPLIFYING COMPLEX INPUT STRINGS

BACKGROUND

1. Field

Embodiments of the invention relate to electronic forms and input fields. More specifically, embodiments of the invention relate to operator-aware analysis of complex input strings.

2. Related Art

With various electronic forms, a user may be presented with one or more input fields for completing computer-related tasks. These input fields typically only accept simple input strings, such as numbers. Often, the user will be prompted to enter an amount or other value that requires external calculation. For example, if the electronic form asks how much the user pays annually in rent, the user will typically not know this figure. Instead, the user will know their monthly rent payment and have to perform the calculation using an extraneous calculator. Once the calculation has been completed, the user will then input the answer into the input field. This requirement for external calculation presents a hassle for the user, disrupts work flow in completing the electronic form, and can introduce potential errors in calculation and transcription. What is lacking in the prior art is a system that accepts and analyzes complex input strings.

SUMMARY

Embodiments of the invention solve the above-mentioned problems by providing a system, a non-transitory computer-readable medium, and a computerized method for the simplification of input data. Embodiments of the invention allow the user to input a complex input string into input fields. The complex input string is then analyzed and simplified, such that it can be utilized in other calculations or form completions.

Embodiments of the invention are generally directed to a computerized method for simplifying user input, the method comprising the following steps: displaying an input field, wherein the input field has an associated expectation identification and an associated range expectation; receiving, from a user, an input string in the input field; identifying at least one operator in the input string indicative of a mathematical operation, such that the input string is a complex input string; identifying a first sub-string and a second sub-string in the input string, wherein the first sub-string and the second sub-string each includes at least one numeric character; comparing the first sub-string to the expectation identification associated with the input field to determine a significance of the first sub-string; comparing the first sub-string to the range expectation associated with said significance to determine if the first sub-string meets the range expectation; and calculating a simplified input string by performing the mathematical operation on the first sub-string and the second sub-string.

Embodiments of the invention are also generally directed to a computer readable medium, having a computer program stored thereon. The computer program instructs at least one processing element to perform the above-discussed steps. Other embodiments of the invention are directed to a system for performing the above-discussed steps.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a system, a computerized method, and a computer program for receiving and simplifying a complex input string. The complex input string is received in an input field. The complex input string is then identified, analyzed, and simplified. The simplified input string may then be utilized to perform calculations, complete a form, or other functions.

Figure 1:
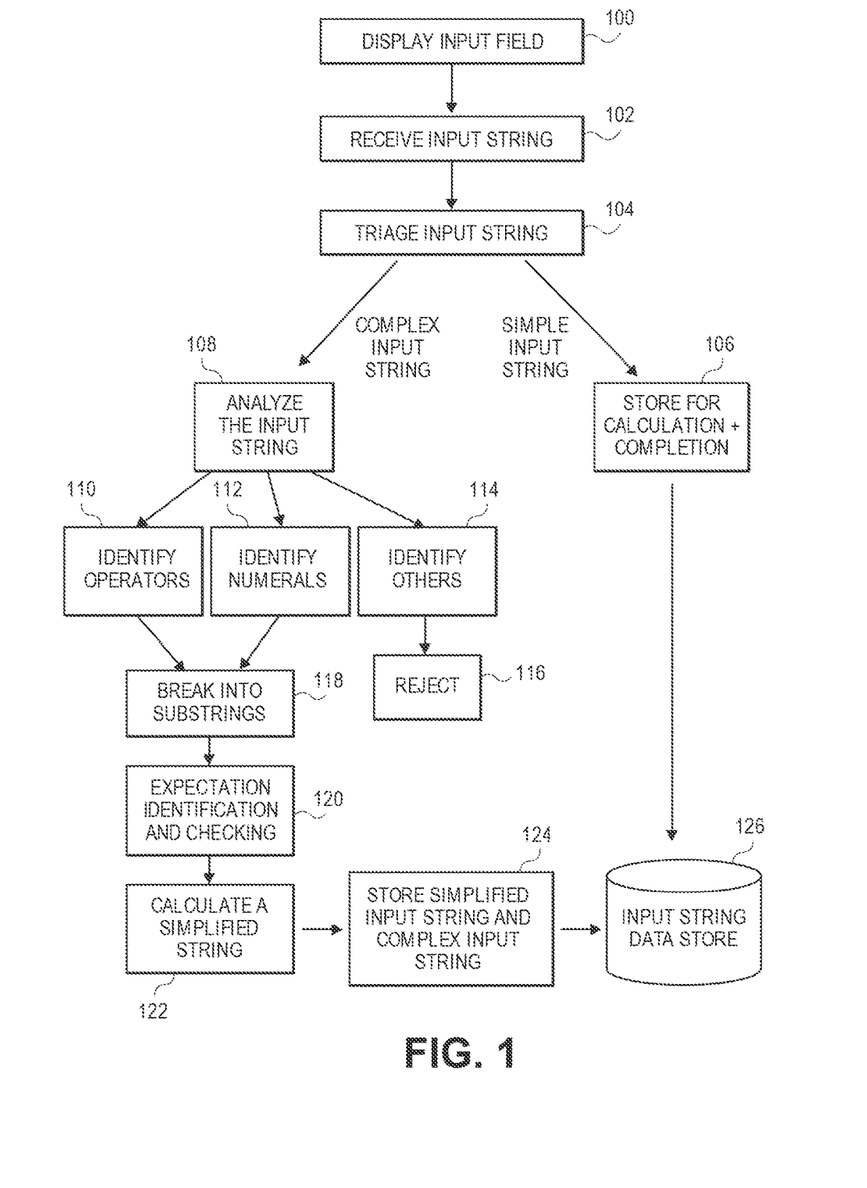
FIG. 1 is a flow diagram of an exemplary embodiment of the invention, illustrating the receiving and storing of the input string.

In Step 100, the system displays the input field. The input field may be presented as part of a graphical user interface (GUI) as discussed below. The input field may be displayed as a component of an electronic form, as a component of an electronic query, as a component of a tax preparation program, or as a component of an electronic resource (e.g., a website or mobile app). The input field is configured to receive user input therein.

In Step 102, the system receives an input string from the user. The user may enter the input string via any of various computer inputs, as discussed below. The input string may be received sequentially (e.g., one character at a time) or simultaneously (e.g., all characters at the same, or substantially the same time). For example, the user may type in the input string via a keyboard or paste in the input string via a computer mouse.

A "string" is a sequence of characters. A string is a data type that is implemented as an array of bytes. Typically, each bite is associated with a single character, via a character encoding. The characters are disposed in a certain sequence, based upon their entry into the system. A string may also denote variables, arrays, or other sequence data types. In some embodiments of the invention, the input string may be a data tree or other abstract data type, an array, a record or other aggregate data structure, a set, a class, an audio file captured from the user speaking the input information (which may utilize a voice-recognition analyzer to identify the spoken information), a picture or image of the handwritten input information (which may utilize an optical character recognition analyzer to identify the written information), or other data structure.

In Step 104, the system will triage the input string. In embodiments of the invention, the triage is a simple analysis in which the system determines whether the input string is a complex input string or a simple input string. A "simple input string" is an input string that contains only numeric characters, or is otherwise indicative of numeric characters. The simple input string is indicative of a rational number. A "complex input string" contains at least one character that is not numeric. The non-numeric character or characters may be alphabetical characters, operators, symbols, emojis, or other characters.

If the triage determines that the input string is a simple input string, in Step 106 the system will store the input string for further calculation or completion. The simple input string is ready for further action, such that the other steps discussed herein are not utilized to simplify the input string. This is because if the input string is a simple input string, the input string already represents a rational number. The input string may be stored in transitory memory, stored in a non-transitory medium, stored in a data store, or stored in another location. The input string may also be associated with metadata related to the input field in which it was associated and other information (such as the time of completion, the order in which the fields were completed, the associated question, query, or name associated with the input field, etc.).

If the triage determines that the input string is a complex input string, in Step 108 the system will analyze the input string. The system analyzes the complex input string to determine how or if the input string can be simplified. In Step 110, the analysis includes identifying operators within the complex input string. "Operators" are characters that provide an indication of a certain mathematical operation. For example, the "x" character may indicate multiplication, the "+" character may indicate addition, the "I" character may indicate division, and the "−" character may indicate subtraction. It should also be appreciated that a leading "−" character may indicate a negative quantity and (if this is the only non-numeral) be classified as a simple input string. In Step 112, the analysis includes identifying numerals within the input string. The numerals may be separated by operators or other characters. In these embodiments, the numerals that are co-located, i.e., entered in adjacent order or directly beside each other, may be determined to be indicative of a single number. For example, the set of numerals "123" is determined to be a single number, i.e., one hundred twenty-three, whereas "123/45" is determined to be two numbers separated by an operator. Additionally or alternatively, numerals that are co-located but separated by a comma or period may be determined to be indicative of a single number, e.g., 3,746 is determined to be the single number three thousand seven hundred forty-six.

In Step 114, the analysis includes identifying characters that are neither numerals nor operators. These other characters could be letters, symbols, or the like. In some embodiments, certain letters and characters may be stricken from the input string. For example, a leading "$" character may be ignored if the input field is expecting a dollar figure. As another example, space characters may also be ignored. Similarly, a trailing "per month" may be ignored or utilized in calculation (as discussed below). For example, if the field requests yearly expenses for a certain category, the user may enter "250*12" or "250 per month." In the former instance, the complex input string would be simplified as discussed below. In the latter instance, the system may interpret the complex input string to be equivalent to the former.

In Step 116, if the system has identified unexpected characters (such as letters and non-operator symbols), the system may reject the input string. The rejection may be displayed to the user. The rejection may include an indication of the character or characters that are being rejected. The rejection may also include an indication of acceptable string characteristics, a request that the user edit or change the input string, or provide another visual or audible indication to the user. Upon the user editing, amending, or replacing the input string, the system may continue as Step 102 above.

In Step 118, the system will break down the complex input string into sub-strings. The sub-strings are typically separated by an operator or other separator. For example, in the above discussed example in which the complex input string is "250*12" the sub-strings would be "250" and "12" being separated by the multiplication operator. In some instances, multiple operators may separate three or more sub-strings. It should be appreciated that in some embodiments, the respective sub-strings are each associated with new, independent strings. In other embodiments, the respective sub-strings are identified components of the input string. In some embodiments, certain text strings may be determined to be sub-strings. For example, "per month" and "per week" may be interpreted as a multiplication operator followed by a "12" and a "52" respectively. In these embodiments, the text string may be replaced by a numeric string that corresponds to the text string. In other embodiments, the text string may remain and be interpreted as intending the numeric string.

In Step 120, the system performs expectation identification and expectation checking. As discussed below, expectation identification considers at least one of the sub-strings to determine the significance or meaning thereof. For example, if the field is requesting a yearly amount of rent paid, one of the sub-strings is expected to correspond with the amount of monthly rent paid and the other is expected to correspond with the number of months that the rent was paid. The system may therefore attempt to determine which sub-string is associated with each expectation. Expectation checking determines whether the identified sub-string falls within an expected range. For example, monthly rent may be expected to fall within a range of $500-$2,000 in the user's zip code. If the identified rent amount falls outside this range or a pre-set deviation from this range (e.g., 20%, 50%, or 75% of the range), expectation checking may reject, note, or alert the user to the discrepancy. The user may then confirm, alter, amend, or change the input string. The user review of the input string is discussed in more depth below.

In embodiments of the invention, the system may also identify multiple rates for a certain input string. For example, if the yearly rent amount entered by the user is "750*7+800*5" as the input string, the system may determine that both "750" and "800" are monthly rent amounts. The system may then present a confirmation for the user to confirm which of the monthly rent amounts is the current amount, such that this amount may be utilized in future calculations or field completions. In some embodiments, the monthly rent amount may also be determined by extrapolating from a full year rent amount being input into the input field. In these embodiments, for example, the user putting in a simple input string such as "9600" may infer that the user is paying $800 per month in rent. This monthly rent amount may thereafter be utilized in various calculations. The system may also present to the user a confirmation that the user can confirm that $800 is their monthly rent amount.

Figure 2:
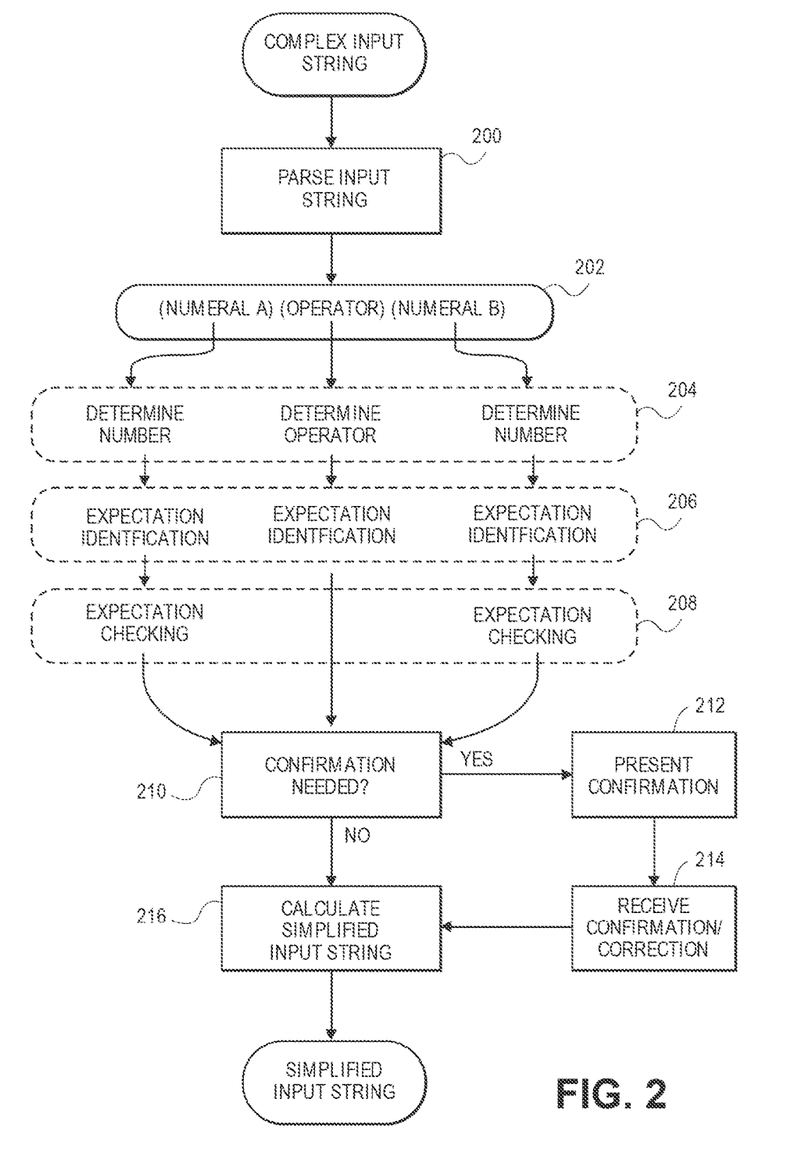
FIG. 2 is a flow diagram illustrating an exemplary operation of changing a complex input string into a simplified input string.

Thus, embodiments of the invention may perform expectation checking based on a known expectation of the input. With the above monthly rent example, the system is expecting a rent value in the range of $500-$2,000, but if the user instead enters "$7000," the system will identify that this amount is beyond the pre-set deviation. The system then alerts the user to the discrepancy, as noted above. This discrepancy could be due to the user adding an extra digit, e.g., a "0" to the amount, inadvertently. Alternatively, the user may not appreciate the question and information being sought by the field, and the alert to the user presents an opportunity for the user to reconsider the question or information sought. As an example, if the field requests "yearly rent paid," and the user misinterprets the request as "monthly rent paid" and enters "$700" (i.e., the user's monthly rent, as opposed to yearly rent), the system may identify the discrepancy based on expectation identification and expectation checking. In embodiments of the invention, a default expectation is applied to perform expectation checking. The default expectation may then be superseded the user input. In embodiments of the invention, a hierarchy of expectations is applied to perform expectation checking. In the hierarchy of expectations, the system may determine whether the entered input string is a total amount, a monthly amount times the number of months, a weekly amount times the number of weeks, or the like. If the input string is not within an expected range, the system may choose the closest example or otherwise request confirmation, as discussed below in Step 210-214.

In Step 122, the system calculates a simplified string based upon the complex input string. The calculation is performed by performing the identified operator on the identified sub-strings. In some embodiments, an order of operations is applied to determine the order in which operators should be calculated (for complex input strings having multiple operators). In some embodiments, the order of operations is a standard mathematical order of operations. In other embodiments, the order of operations is a system-specific order of operations or an input field-specific order of operations.

For example, the system may utilize a left-to-right order of operations because the user is likely intending the operations to be performed in that order. As an illustrative example, assume the field requests the user's yearly housing and utilities budget. Instead of adding up each of the relevant expenses (rent, electricity, gas, Internet service, etc.), the user enters the following string: "700+125+300+250/2*12." If entered into a calculator, and applying the mathematical order of operations, the string is interpreted to be 250/2=125; 125*12=1500; 1500+700+125+300=2625. In contrast, if the user entered the above string in embodiments of the invention applying the expectation identification and checking features, the string is calculated as (700+125+300+(250/2)) *12=15,000. This may occur if the user is adding up monthly expenses of 700, 125, 300, and (250/2) (because the 250 expense is split with their roommate, for example), and multiplying the total by 12 to obtain a yearly expense. Embodiments of the invention recognize that the field is requesting a yearly housing and utilities budget and that based on the content and order of the entered string, it is inappropriate to apply the mathematical order of operations because such would not satisfy the expected value for the user's yearly housing and utility expenses. In some embodiments, if the order of operations may affect the final calculated value, the below-discussed confirmations may include a confirmation of the desired order of operations. The system may additionally recommend an order of operations based upon the expected values for that input field. In embodiments of the invention, the detected presence of parentheses in the input string may override a standard left-to-right order of operations and instead utilize a standard mathematical order of operations. In some embodiments, the system may determine whether different orders of operation would render a different answer. In these instances, where an order-of-operation-dependent discrepancy between results is determined, the system may present the user with a confirmation to determine which order of operations would be the most appropriate. In some embodiments, the system may also present a recommended order of operations and ask the user to confirm the use of the recommended order of operations.

In Step 124, both the simplified input string and the complex input string are stored. The simplified input string may be utilized for direct calculations and completion. The sub-strings of the complex input string may be utilized for other calculations and completion. The sub-string may be relevant to other input fields. For example, if a first input field requires yearly total rent payments, and a second input field requires total monthly expenses, the monthly rent payment may be suggested as belonging within the total monthly expenses. The system may then auto-complete, expect, or otherwise associate the sub-string of the monthly rent payment with the second input string.

In Step 126, the various input strings are stored in an input string data store. The input string data store provides the various input strings for later retrieval for subsequent calculation and form completion. In some embodiments, the input string data store may be accessed for auditing purposes (e.g., to access a more detailed description of the origin of the simplified input string) or for sending to a third party (such as the Internal Revenue Service). The input string data store may also be accessed for completing subsequent input fields. The input string data store may also be accessed by external programs and systems for the completion of input fields. For example, tax-related information may be utilized by a financial planning system for budgeting purposes or by a tax planning system for estimating quarterly tax payments.

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software. Embodiments of the invention therefore assist the user in preparing a tax return. Embodiments of the invention may also be used in other types of software products, such as financial management software, other types of tax preparation software (e.g., software for use by a tax professional), payroll software, and the like.

The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. Many of these calculations require the user to perform preliminary calculations before entering information into the associated fields. The tax return can be either written, digital, or a combination of both. In other embodiments, information relevant to the taxpayer and the tax to be paid are provided on other various forms and documents.

Other embodiments of the invention are suitable for completing a variety of types of forms provided by a variety of different entities. For example, governments commonly provide forms that must be completed to, for example, obtain government services or benefits or comply with various rules or regulations. For example, a doctor may provide a paper form to be filled out by a patient to obtain patient information. As another example, a bank may provide a digital form to be filled out by a loan applicant to obtain a loan. Embodiments of the invention are applicable to various types of entities providing forms to be completed by a user, and it should be appreciated that embodiments of the invention may be applied to any particular type of entity, service, or product.

It should be appreciated that although the entity completing the input field is labeled herein a user, embodiments of the invention contemplate that any entity may receive, complete, and submit information in the input fields. The user may complete the input field on behalf of another. In embodiments discussed for submitting tax forms, the user may be a taxpayer, a tax preparer, a financial professional, or other legal or natural person. Thus, use of the labels "user" and "taxpayer" herein is not intended to be limiting, and may be used interchangeably.

In embodiments of the invention, the input field appears on a form document. The form document may be a physical, printed copy (hardcopy) of the document or a digital copy of the document. Additionally, or in the alternative, the document can be an electronic file containing text, structure, design, fonts, colors, and/or images. Additionally, or in the alternative, the document can be in any other format or medium that can be preserved and represented. The form document may be publicly available via a form repository, privately available, secured (requiring computer authentication prior to display) or unsecured, and it may be a copy or an original. As defined in this paragraph, the form document can refer to the blank form document as input by the user, the captured image thereof, the digitally recreated form document, necessary accompanying documents for the form document, the completed form document, etc.

Turning to FIG. 2, a more detailed description of a method of changing a complex input string into a simplified input string is illustrated. A complex input string is received or otherwise acquired. In some embodiments, all input strings may be analyzed in the discussed method. In other embodiments, simple input strings may be triaged (as discussed above in Step 104) such that simple strings do not undergo the discussed steps.

In Step 200, the input string is parsed. Each character is identified and categorized. Examples of categorizes may include numerals, operator, letters, non-operator symbols, and others. Adjacent characters of the same category may then be grouped into sub-strings. Adjacent characters of the same category may be presumed to be related, and thus belong to a common sub-string. For example, "450" contains three adjacent characters that are all numerals, and thus will be considered a single sub-string. In Step 202, the identified operators and sub-strings are prepared for analysis. Step 202 illustrates an exemplary layout of two sub-strings divided by an operator. Numeral A is a sub-string of at least one numeric character. Numeral B is also a sub-string of at least one numeric character. The operator is a character indicative of a mathematical operation, such as multiplication, addition, division, or subtraction.

In Step 204, the system determines what number or mathematical operator is indicated by the respective components of the complex input string. Thus, to follow the above example, the system would interpret the three characters as a sub-string "450" and being indicative of four hundred fifty. Similarly, the system will determine what mathematical function is intended based upon the operator.

In Step 206, the system performs expectation identification on at least one sub-string or operator. In some embodiments, the system performs expectation identification on all of the sub-strings and operators. Expectation identification is a determination of the significance or meaning behind a certain sub-string or operator. The input field may have an associated expectation for the input therein. This expectation may be indicative of the type of data expected of a complex input string. For example, if the input string requests a summation of several figures, the input string may include an expectation of at least one addition operator (as it would be desirable for the user to add these expenses within the input field). As another example, if the input string requests total yearly expenses for a certain category, the input string may include an expectation of at least one multiplication operator (as it would be common for the user to multiply the monthly expenses by the number of months, or the weekly expenses by the number of weeks). As yet another example, if the input string requests monthly income less expenses for a certain category, the input string may include an expectation of at least one subtraction operator. In some instances, the input string may also include multiple expectations for various operators.

Also in Step 206, the system determines which sub-string (e.g., Numeral A or Numeral B as illustrated in FIG. 2) is associated with each expectation. Similar to the expected operator, the input field may include at least one expected numeral. The expected numeral may be indicative of the type of information expected within the input field. For example, if the input field is requesting yearly rent payments, the input field may include an expected numeral of monthly rent and an expected numeral of months in which rent was paid. If the user inputs "1500*12" in this field, expectation identification is identifying that $1,500 is the monthly rent payment and 12 is the number of months in which rent was paid. In some embodiments of the invention, expectation identification is performed by identifying if any of the numeral sub-strings fall within the expected ranges, as discussed below. If the expected ranges do not overlap, and one sub-string falls in each, the system can determine that the sub-string is associated with the numeral expectation into which range it fits. In other embodiments, the relative size of the two numerals may be considered. For example, the large number may be determined to be the expenses, and the smaller number may be determined to be the number of months or weeks in which the expenses were paid. In still other embodiments, certain sub-strings may be presumed to be associated with certain expectations based upon numerical value. For example, "12" may be automatically determined to be a number of months, "26" may be automatically determined to be bi-weekly period, "52' may be automatically determined to be a number of weeks, and other common numbers that would be expected for that input field. In some embodiments, numbers that are substantially close to these figures may be determined to be the appropriate figure.

In Step 208, the system performs expectation checking on the various sub-strings. For sub-strings, expectation checking is a determination that the sub-string is within an expected range or is otherwise likely a true and correct figure for the user and the input field. Like the above discussed expectation as to the type of information within the field, the input field may also include a range expectation, a set expectation, formulaic expectation, or other expectation such that the system can determine whether the respective sub-string is as expected for that input field. For example, for an input field requesting monthly rent payments, an expected range may include $500-$2,000. The expected range may be determined based upon user information (such as a zip code or other geographic information), pattern information (such as based upon the rents reported by other users), or static information (such as based upon a predefined range). The expectation may also be based upon the responses to other input fields. For example, if in a previous input field, the user indicated that their monthly rent was $500, an indication that the user's rent is $13,000 may be determined to be outside the expected value or range.

Similarly, expectation may be for a certain operator for the input field. So, in some instances an input field may expect a multiplication operator or an addition operator. Expectation checking may therefore include determining whether the operator expected is present.

It should be appreciated that in embodiments of the invention, the above-discussed expectation identification and expectation checking steps are performed for simple input strings. In these embodiments, the system performs similar identification of the significance of the simple input strings and checks the value against a range, or other expected set as discussed above. In this way, the system is error checking all of the input fields and not only the ones completed by the user with a complex input string. The system is also identifying the significance of certain values for use in other calculations and completions.

It should also be appreciated that, like other method steps described herein, Steps 200-208 may be performed simultaneously or in any order. The illustrated order shown in FIG. 2 and discussed above is merely an exemplary embodiment to aid the understanding of the reader.

In Step 210, the system determines whether confirmation from the user is needed to confirm the results of the above-discussed steps. If the system failed to determine the number or the operator in Step 204, the system may request confirmation as to the number or operator intended by the user. For example, if there is an "x" between two numbers, this may require confirmation that a multiplication operator was intended by the user. Similarly, if numerals are separated by a comma or a space, this may require confirmation whether the two numerals are intended to be separated or considered a single numeral. If the system failed to identify what numerals correspond to what expectation, the system may require confirmation as to the significance of the sub-string. In other embodiments, confirmation is requested even when the numerals and operators meet the expectations.

In Step 212, the system will present the confirmation request to the user. The confirmation request may include information as to the determination made by the system in the above-mentioned steps. The confirmation may also present an input for the user to confirm the information either individually or collectively. In Step 214, the system receives confirmation that the user has confirmed or edited the input string. For example, this may include typing revised characters in the input string, pressing an electronic button indicative of approval, or providing other electronic feedback. In some embodiments, receiving confirmation may be done by the user moving on to enter information in another input field, or by performing other actions.

In Step 216, the system calculates a simplified string based upon the determined numerals and operators. This step may be performed before, during, or after the confirmation is received. The simplified string is typically a standard numeral that is the result of the mathematical operation or operations indicated by the operator. This simplified input string may then be displayed. In some embodiments, the simplified input string is displayed along with the complex input string during the confirmation, such that the user can see what the resultant simplified string will be. In some embodiments, the expectation checking is additionally or alternatively performed on the simplified string.

Figure 3:
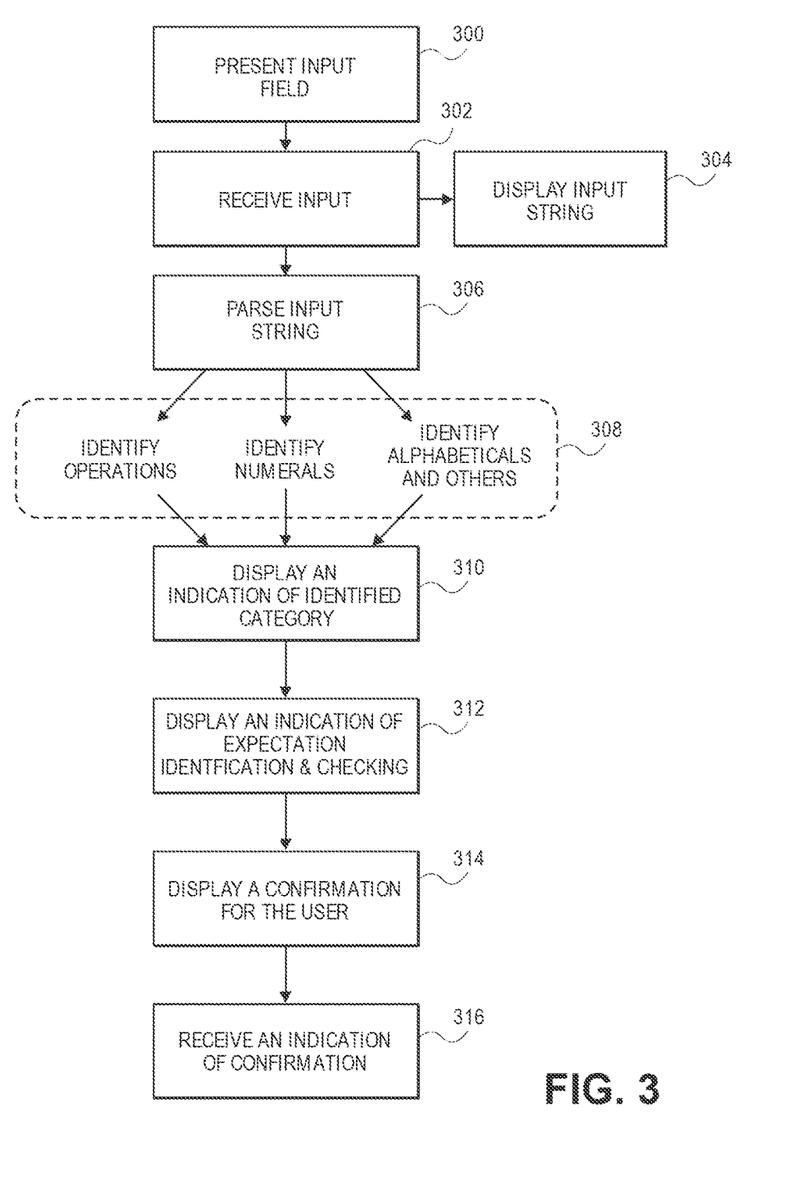
FIG. 3 is a flow diagram illustrating an exemplary operation of confirming the simplification of the complex input string.

Turning to FIG. 3, steps performed on the GUI are illustrated. The GUI displays the input field, receives the input string therein, displays the input string and an indication of the analysis thereon, and receives a confirmation thereon. The GUI may be a component of a tax return preparation program, a form completion program, a survey program, a financial program, or other electronic resource.

In Step 300, the GUI presents the input field. The input field may be a generally rectangular box, or another shape as appropriate. The input field may be displayed as a component of a form, on a page of the GUI, as a stand-alone window, or the like. In Step 302, the input field receives the input string therein. The input may be delivered by a computer mouse, a computer keyboard, a computer number pad, a virtual keyboard, voice recognition software, or other input structure. In Step 304, the GUI displays the input string. The displayed input string may be shown as the input is received via the various input methods.

The GUI may also display custom objects on or adjacent to the input field. The custom object may have been added or associated with the form document, the GUI, or the like. In some embodiments of the invention, the custom object is a representation of an external resource. The custom objects may include, but are not limited to, applets to perform functions, plugins to display various media, etc. Objects, and the functions they perform, may be triggered custom events, as discussed below.

The custom events respond and react to the user input. The custom events, either alone or in combination, trigger objects and other functions to be completed. There are a number of possible custom events including, but not limited to, mouse-based events (such as on the clicking of an element, on the pointer moving over an element, on the dragging of an element, etc.), keyboard-based events (such as on the pressing of a certain key, etc.), object-based events (such as on the navigation to a certain webpage, on resizing of the window, etc.), form-based events (such as on the clicking on a particular field, on the resetting of the form, on the selection of text, on the submission of the completed form, etc.), printer-based events, media-based events, server-based events (such as on an error by the server to save the completed form document), etc.

In Step 306, the input string is parsed, as discussed above in Step 200. In Step 308, the operators, numerals, alphabetical characters, and the like are identified and classified. In some embodiments, these steps are performed in substantially real time, such that the indications thereof (as discussed below) are displayed as the user is typing in or otherwise entering the information into the input field.

In Step 310, the GUI presents an indication of the identified category for at least one character. In some embodiments of the invention, this indication may show that the system has recognized a complex input string, an indication of which numeric characters are considered to be a single number, the category of each character, and other information indicative of the category. For example, the GUI may label numerals with a first color highlight (or turn the text color to a first color), label operator with a second color highlight (or turn the text color to a second color), label other categories of characters with a third color highlight (or turn the text color to a third color), or otherwise distinguish the text of the input string based upon the categorization of the various characters.

In Step 312, the GUI presents an indication of the expectation identification and expectation checking that was performed in Steps 206 and 208. The presentation of the expectation identification may include an indication of the calculated or determined significance of each numeral. This indication could include a fly-out box or other visual representation. The presentation of the expectation checking may include a visual depiction of the range or expected set of values. The presentation of the expectation checking may also include an indication of where the determined value falls into that range.

In Step 314, the GUI displays a confirmation for the user. The confirmation may allow the user to select that the expectation identification and the expectation checking are correct and that the entered input string is correct. The confirmation may also allow the user to change the expectation identification to correct misapplied labels and categorizations for the sub-strings. The confirmation may also request the user edit the input string to correct typographical or understanding errors. In Step 316, the GUI receives an indication that the user has approved or corrected the confirmation that was displayed. This may be through clicking a digital confirmation button, moving on to the next input field, or the like.

In embodiments of the invention, the system does not change the underlying field but instead overlays on the GUI information indicative of the determined expectation identification and expectation checking. For example, the GUI may overlay with "number of months times dollars per month" as an explanation of the expectation identification. The GUI may also overlay, for example, "Please confirm this monthly rent amount as it falls outside the average monthly rent range for your zip code." In some embodiments the overlay may accept the input string therein. For example, the overlay may present a previously entered monthly rent amount (either in the system, in a previous input field, or in another database accessible by the system) and ask the user to confirm this amount for a subsequent field. The GUI overlaying on top of the input field may also enter the full amount in the form at the appropriate location. This may provide an advantage in changing what the user is seeing, without changing the underlying document. This may also provide an advantage of making the overlay specific to that user based on past information, without having to change the underlying document. This may also provide the advantage of allowing the user to enter parceled information.

In some embodiments, the system provides contextual help for the user. Contextual help is a set of information helpful for a user in understanding the expectation of a particular field. For example, if the field is labeled "Yearly Rental Payments," the system may display a button or link near that field for contextual help. If the user selects that button or link (based upon a custom event as discussed above), the system may bring up a bubble of information directly over or nearby the input field (or in another location). The contextual help may assist the user in understanding what the appropriate input is for that field, how to calculate or locate that information, where to get additional information, etc. Contextual help may also be presented to initially assist the user in filling in the input field. For example, the contextual help may recommend that the user input the information in the format of monthly rent multiplied by the number of months in which rent was paid.

Contextual help is located and supplied based upon the field name, the field type, field expectation, and other input field characteristics. The system may access a relevant data store to retrieve the contextual help. This retrieval may be upon the loading of the page, or upon the triggering of an event (such as on a pointer over the contextual help button or link).

The user may then add to or edit the information in these fields. The system may also specifically present or highlight the fields that were not completed, or were potentially completed incorrectly. The system may also error check the user's edits and additions, and verify that the user has completed all of the fields on the form document. The system may highlight or otherwise bring to the user's attention any discovered errors or uncompleted fields.

In other embodiments of the invention, a pop-up, a separate window, or other type of secondary display may be presented to the user upon the user beginning to enter information into the field. The secondary display may show the user how the calculation is being performed as the user types in the string or once the string is completed. For example, the secondary display may show the user how the order of operations is being performed on the entered string. This is especially helpful when the order of operations actually being calculated by the system is different than the order of operations indicated by the input string (as based on mathematical rules). Alternatively, the system may reorder the string based on the applied order of operations to more easily illustrate to the user the order of operations being performed.

In yet further embodiments of the invention, the system monitors the keystroke entry of the user (including pasting a string, as opposed to entering via a keyboard or other input device). The system may be monitoring for the timing of entry (e.g., the user is entering the string above or below a pre-set threshold of time). If the user is determined to be entering the string slowly, a secondary display may be presented asking the user if they need assistance in entering the string. Additionally or alternatively, the secondary display may present sub-fields breaking down the requested information by component parts. As an example, if a primary field requests the yearly housing and utilities amount, and the user takes more than a pre-set threshold of time to enter the string once the user has begun entering the string, then the secondary display may be presented. To further illustrate, perhaps the user begins entering "700," but then there is a pause (again, above a pre-set threshold or time) of 10 seconds. The system may use this information (both the entered amount and the time of the pause) to determine the user could possibly need assistance in completing the asked question. The secondary display may then present a set of subfields categorized by "housing amount," "electricity amount," "Internet amount," etc. that the user can then separately enter. As a related embodiment, the GUI may dynamically alter based on the entered information, the determination of time outside the pre-set threshold, and other information, to present the sub-fields.

Embodiments of the invention may also dynamically alter the GUI and the requested information based on the beginning value(s) of a string. Using the same above example of the field requesting the yearly housing and utilities amount, if the user begins by entering "700+130+250/2," the system may respond by inserting "*12" into the field and otherwise visually displaying this for emphasis to the user to indicate that the entered string will be multiplied by "12." As an alternative contrast, the user could begin entering the string with "12*" and the display then presents sub-fields of "housing," "electricity," "Internet," etc.

The ability of embodiments of the invention to monitor entries into a field and dynamically react to entered information to present a GUI with field entries that is responsive to the enter information is advantageous for certain types of data entry, such as determining home office deductions. As but one of many examples, if the field requests the housing amount for the home office, embodiments of the invention may determine that the housing amount for the entire house was "$700" based on entered information for another field. The system could then present a secondary display to the user asking "what is the square foot percentage of your house devoted to the home office" or "what is the percentage of time of a work week that you use your home office." The system then receives the user's response, for example "20%," applies this 20% to the known $700 amount for monthly rent, and completed the requested field of housing amount for the home office as $140. This could then be extrapolated to other costs associated with the home office, such as utilities. The user is not required to perform the logic associated with answering the particular question of housing amount for the home office, and the ease of entry via the GUI is increased for the user due to the dynamic reaction of the system to the user's entered information. The system utilized the information entered for one field in providing the requested information for a subsequent field.

Figure 4:
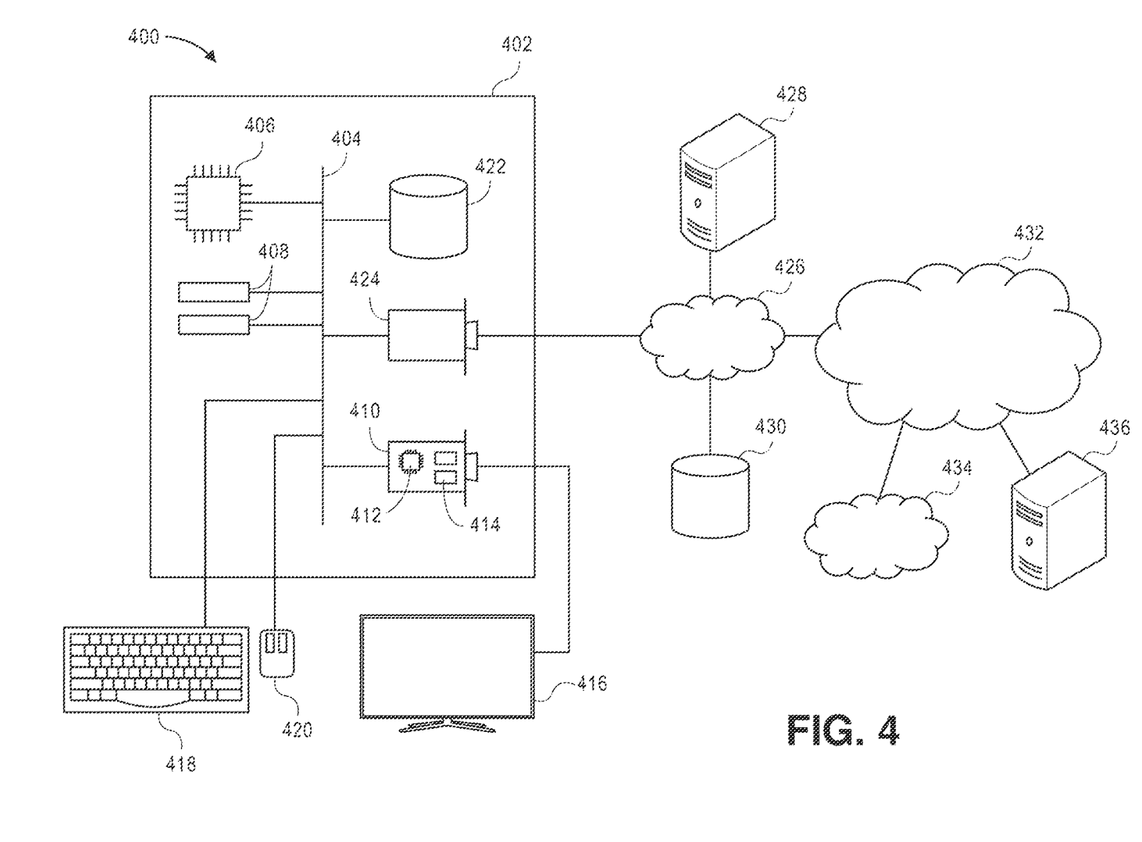
FIG. 4 is a system diagram of an embodiment of the invention depicting various computing devices and their components.

Turning to FIG. 4, a system of embodiments of the invention will now be discussed. The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The system 400 comprising an exemplary hardware platform that can form one element of certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408.

Also attached to system bus 404 is graphics card 410. In some embodiments, graphics card 404 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Local network 426 is in turn connected to Internet 432, which connects many networks such as local network 426, remote network 434 or directly attached computers such as computer 436. In some embodiments, computer 402 can itself be directly connected to Internet 432.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the user may be provided with a user account that permits the user to access embodiments of the invention that are applicable to the completing of input fields. Additionally, a tax preparer or financial professional may be provided with a tax preparer account or financial professional account, respectively, through which he can complete and manage the input fields on behalf of the user. In addition, any number and/or any specific types of account are provided to carry out the functions, features, and/or implementations of the invention. Upon the user, tax preparer, and/or financial professional logging in to the electronic resource for a first time, they may be required to provide various pieces of identification information to create their respective accounts. Such identification information may include, for instance, personal name, business name, email address, phone number, or the like. Upon providing the identification information, the user, tax preparer, and/or financial professional may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computerized method for simplifying a user input into a tax return preparation program, the method comprising the following steps:

displaying, on a display of a computer, an electronic form of the tax return preparation program comprising an input field requesting tax-related information,     wherein the input field has an associated expectation identification based upon the tax-related information indicative of an at least one first expected numeral, and the at least one first expected numeral has an associated range expectation based upon the tax-related information;

receiving, from a user through an input structure of the computer, a complex input string in the input field;

identifying, by a processor of the computer, an at least one operator in the complex input string indicative of a mathematical operation;

identifying, by the processor, a first sub-string and a second sub-string in the complex input string;

determining, by the processor, if the first sub-string meets the range expectation associated with the at least one first expected numeral by determining that the first sub-string falls within a pre-set deviation of the range expectation associated with the at least one first expected numeral;

determining, by the processor, in response to determining that the first sub-string meets the range expectation associated with the at least one first expected numeral, a significance of the first sub-string associated with the at least one first expected numeral;

determining, by the processor, in response to determining that the first sub-string meets the range expectation associated with the at least one first expected numeral, the tax-related information as a simple input string by performing the mathematical operation on the first sub-string and the second sub-string;

displaying, on the display of the computer, the simple input string;

storing, in a memory of the computer, the first sub-string along with the significance of the first sub-string for usage in a subsequent calculation;

identifying, by the processor, a first subsequent input field of the electronic form of the tax return preparation program associated with the stored significance of the first sub-string;

overlaying, on the display of the computer, a request for a second input string associated with the first subsequent input field;

receiving, from the user through the input structure of the computer, the second input string;

calculating, by the processor, a value using the stored first sub-string and the received second input string; and automatically entering, by the processor, the calculated value in the first subsequent input field.

2. The computerized method of claim 1, further comprising the following steps:

presenting to the user a rejection of the complex input string if an at least one character is neither a number nor an operator; and requesting the user edit the complex input string to overcome the rejection.

3. The computerized method of claim 1, further comprising the following steps:

wherein the expectation identification associated with the input field is indicative of an at least one second expected numeral, and the at least one second expected numeral has an associated range expectation based upon the tax-related information;

comparing the second sub-string to the expectation identification associated with the input field to determine a significance of the second sub-string; and comparing the second sub-string to the range expectation associated with the at least one second expected numeral to determine if the second sub-string meets the range expectation associated with the at least one second expected numeral.

4. The computerized method of claim 1, further comprising the following step:

storing the complex input string and the simple input string in an input string data store.

5. The computerized method of claim 4, further comprising the following step:

utilizing the simple input string for a future calculation associated with a second subsequent input field.

6. The computerized method of claim 1, further comprising the following steps:

displaying, on the display of the computer, an indication of said significance of the first sub-string; and displaying, on the display of the computer, an indication of whether the first sub-string meets the range expectation associated with the at least one first expected numeral.

7. The computerized method of claim 6, further comprising the following steps:

requesting the user confirm the indication of said significance and the indication of whether the first sub-string meets the range expectation associated with the at least one first expected numeral; and receiving, from the user, an indication of confirmation.

8. A non-transitory computer readable medium having a computer program stored thereon for simplifying user input into a tax return preparation program, wherein the computer program instructs at least one processor of a computer to perform the following steps:

displaying, on a display of the computer, an electronic form of the tax return preparation program comprising an input field requesting tax-related information, wherein the input field has an associated expectation identification based upon the tax-related information indicative of an at least one first expected numeral, and the at least one first expected numeral has an associated range expectation based upon the tax-related information;

receiving, from a user through an input structure of the computer, a complex input string in the input field;

identifying, by the processor, at least one operator in the complex input string indicative of a mathematical operation;

identifying a first sub-string and a second sub-string in the complex input string;

determining, by the processor, if the first sub-string meets the range expectation associated with the at least one first expected numeral by determining that the first sub-string falls within a pre-set deviation of the range expectation associated with the at least one first expected numeral;

determining, by the processor, in response to determining the first sub-string meets the range expectation associated with the at least one first expected numeral, a significance of the first sub-string associated with the at least one first expected numeral;

determining, by the processor, in response to determining the first sub-string meets the range expectation associated with the at least one first expected numeral, the tax-related information as a simple input string by performing the mathematical operation on the first sub-string and the second sub-string;

displaying, on the display of the computer, the simple input string;

storing, in a memory of the computer, the first sub-string along with the significance of the first sub-string for usage in a subsequent calculation;

identifying, by the processor, a first subsequent input field of the electronic form of the tax return preparation program associated with the stored significance of the first sub-string;

overlaying, on the display of the computer, a request for a second input string associated with the first subsequent input field;

receiving, from the user through the input structure of the computer, the second input string;

calculating, by the processor, a value using the stored first sub-string and the received second input string; and automatically entering, by the processor, the calculated value in the first subsequent input field.

9. The non-transitory computer readable medium of claim 8, further comprising the following steps:

presenting to the user a rejection of the complex input string if at least one character is neither a number nor an operator; and requesting the user edit the complex input string to overcome the rejection.

10. The non-transitory computer readable medium of claim 8, further comprising the following steps:
storing the complex input string and the simple input string in an input string data store; and
utilizing the simple input string for a future calculation associated with a second subsequent input field.

11. The non-transitory computer readable medium of claim 8, further comprising the following steps:
displaying, on the display of the computer, an indication of said significance of the first sub-string;
displaying, on the display of the computer, an indication of whether the first sub-string meets the range expectation associated with the at least one first expected numeral;
requesting the user confirm the indication of said significance and the indication of whether the first sub-string meets the range expectation associated with the at least one first expected numeral; and
receiving, from the user, an indication of confirmation.

* * * * *